US012722109B2

(12) United States Patent
Konno

(10) Patent No.: US 12,722,109 B2
(45) Date of Patent: Sep. 1, 2026

(54) VEHICLE AIR CONDITIONING SYSTEM

(71) Applicant: NGK INSULATORS, LTD., Nagoya-City (JP)

(72) Inventor: Yoshiki Konno, Tajimi (JP)

(73) Assignee: NGK INSULATORS, LTD., Nagoya-City (JP)

(*) Notice: Subject to any disclaimer, the term of this patent is extended or adjusted under 35 U.S.C. 154(b) by 114 days.

(21) Appl. No.: 18/678,086

(22) Filed: May 30, 2024

(65) Prior Publication Data

US 2024/0424437 A1 Dec. 26, 2024

(30) Foreign Application Priority Data

Jun. 22, 2023 (JP) ................................ 2023-102764

(51) Int. Cl.

*B01D 46/24* (2006.01)
*B60H 1/00* (2006.01)
*B60H 3/02* (2006.01)
*B60H 3/06* (2006.01)

(52) U.S. Cl.

CPC ..... *B01D 46/2418* (2013.01); *B60H 1/00507* (2013.01); *B60H 1/00828* (2013.01); *B60H 3/024* (2013.01); *B60H 3/0633* (2013.01); *B01D 2257/80* (2013.01); *B01D 2259/4566* (2013.01); *B60H 2003/0691* (2013.01)

(58) Field of Classification Search

CPC ........... B01D 46/2418; B01D 2257/80; B01D 2259/4566; B60H 1/00507; B60H 1/00828; B60H 3/024; B60H 3/0633; B60H 2003/0691

See application file for complete search history.

(56) References Cited

U.S. PATENT DOCUMENTS

2020/0223293 A1 7/2020 Matsumoto et al.
2021/0041141 A1 2/2021 Miyairi et al.
2024/0317026 A1* 9/2024 Saito ...................... B60H 3/024
2024/0424437 A1* 12/2024 Konno ............... B60H 1/00507
2024/0424854 A1* 12/2024 Konno ................ B60H 3/0633

(Continued)

FOREIGN PATENT DOCUMENTS

CN 119175992 A * 12/2014 ........... B60H 3/0633
CN 115848106 A * 3/2023 ............. B01D 53/82

(Continued)

*Primary Examiner* — Ljiljana V. Ciric

(74) *Attorney, Agent, or Firm* — Muncy, Geissler, Olds & Lowe, P.C.

(57) ABSTRACT

A vehicle air conditioning system includes: a dehumidifying device; a power source; an inflow pipe for allowing air from a vehicle interior or a vehicle exterior to flow into the dehumidifying device; a first outflow pipe for returning the air that has been dehumidified by the dehumidifying device to the vehicle interior; a second outflow pipe through which the air containing moisture released by a regeneration process of the dehumidifying device is circulated; and a switching valve provided at a branch portion between the first outflow pipe and the second outflow pipe, the switching valve being capable of switching the flow of the air to the first outflow pipe or the second outflow pipe. A steam trap is provided in the second outflow pipe. The second outflow pipe merges with the first outflow pipe on a downstream side of the steam trap.

10 Claims, 6 Drawing Sheets

(56) References Cited

U.S. PATENT DOCUMENTS

| | | | | |
|---|---|---|---|---|
| 2024/0424867 | A1* | 12/2024 | Konno | B60H 3/024 |
| 2024/0424868 | A1* | 12/2024 | Konno | B60H 1/00828 |
| 2026/0034497 | A1* | 2/2026 | Hamada | B01D 53/0438 |

FOREIGN PATENT DOCUMENTS

| | | | | |
|---|---|---|---|---|
| EP | 0358110 | A2 * | 3/1990 | B01D 53/0407 |
| JP | 2015117139 | A * | 6/2015 | H01M 8/04089 |
| JP | 6299027 | B2 * | 3/2018 | H01M 8/04388 |
| JP | 2020-104774 | A | 7/2020 | |
| JP | 2020-111282 | A | 7/2020 | |
| WO | 2020/036067 | A1 | 2/2020 | |

* cited by examiner

VEHICLE AIR CONDITIONING SYSTEM

CROSS REFERENCE TO RELATED APPLICATIONS

The present invention claims the benefit of priority to Japanese Patent Application No 2023-102764 filed on Jun. 22, 2023 with the Japanese Patent Office, the entire contents of which are incorporated herein by reference in its entirety.

FIELD OF THE INVENTION

The present invention relates to a vehicle air conditioning system.

BACKGROUND OF THE INVENTION

In various types of vehicles such as automobiles, there are increasing requirements for improvement of vehicle interior environment. Specific requirements include reduction of an amount of $CO_2$ in the vehicle interior to suppress driver's drowsiness, control of humidity in the vehicle interior, and removal of harmful volatile components such as odor components and allergy-causing components in the vehicle interior. The effective measure for such requirements includes ventilation, but the ventilation causes a large loss of heater energy in winter, leading to a decreased energy efficiency in winter. In particular, a battery electric vehicle (BEV) has a problem that its cruising range is significantly reduced due to its energy loss.

As a method for solving the above problem, Patent Literatures 1 and 2 disclose a vehicle air conditioning system in which components to be removed such as $CO_2$ and moisture (water vapor) in the air in the vehicle interior are trapped by a functional material such as an adsorbent, and the components to be removed are then reacted or desorbed by heating to discharge them to the vehicle exterior and regenerate the functional material. Such a vehicle air conditioning system requires more contact between the air and the functional material in order to ensure the performance of trapping the components to be removed, and the ability of the functional material to be heated to a predetermined temperature in order to facilitate the regeneration of the functional material. The regeneration can be carried out, for example, by removing the components to be removed, which are adsorbed on the functional material, through an oxidation reaction, and by desorbing and releasing the components to be removed, adsorbed on the functional material, but both cases require the heating of the functional material at an appropriate temperature depending on the type of the adsorbed components to be removed.

On the other hand, Patent Literature 3 discloses a heater element, including: a pillar shaped honeycomb structure having an outer peripheral wall and partition walls disposed on an inner side of the outer peripheral wall and defining a plurality of cells forming flow paths from a first end face to a second end face, wherein the partition walls have a PTC property, the partition walls have an average thickness of 0.13 mm or less, and the first end face and the second end face have an opening ratio of 0.81 or more. This heater element is used for heating a vehicle interior, and is an efficient heating means because the honeycomb structure allows the heating area to be increased. Therefore, the use of such a heater element as a support for the functional material can contribute to the shortening of the regeneration time of the functional material. In particular, it is believed that since this heater element can be heated by electric conduction and has a PTC property, it can easily heat the functional material, while suppressing excessive heat generation and thermal deterioration of the functional material. Further, since the risk of excessive temperature is avoided, safety can be ensured even if small initial resistance is set to increase a heating rate, and the temperature can be increased in a short period of time.

In conventional vehicle air conditioning systems, the functional materials are heated during the regeneration process, thereby causing the components to be removed that are trapped by the functional materials to be reacted or desorbed, and then released to the vehicle exterior together with the heated air, which would lead to waste of heat energy. However, when the component to be removed is moisture, a dehumidifying material is used as the functional material. If the moisture released into the air during the regeneration process of the dehumidifying material can be selectively removed, the heated air could be effectively utilized for space heating, and the like.

The present invention was made to solve the problems as described above. An object of the present invention is to provide a vehicle air conditioning system that can effectively utilize heated air while selectively removing moisture released into the air during the regeneration process of the dehumidifying material (dehumidifying layer).

PRIOR ART

Patent Literatures

[Patent Literature 1] Japanese Patent Application Publication No. 2020-104774 A

[Patent Literature 2] Japanese Patent Application Publication No. 2020-111282 A

[Patent Literature 3] WO 2020/036067 A1

SUMMARY OF THE INVENTION

As a result of intensive studies for vehicle air conditioning systems including dehumidifying devices having dehumidifying layers formed on partition walls of honeycomb structures, the present inventor has found that the above problems can be solved by providing a steam trap in a pipe through which air containing moisture released by the regeneration process of the dehumidifying device is circulated, and by allowing the pipe to merge with a pipe for returning the air to the vehicle interior on a downstream side of the steam trap, and has completed the present invention. That is, the present invention is illustrated as follows:

(1)

A vehicle air conditioning system, comprising:

a dehumidifying device comprising: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; a pair of electrodes provided on the first end face and the second end face; and a dehumidifying layer formed on a surface of each of the partition walls;

a power source for applying voltage to the pair of electrodes;

an inflow pipe for allowing air from a vehicle interior or a vehicle exterior to flow into the dehumidifying device;

a first outflow pipe for returning the air that has been dehumidified by the dehumidifying device to the vehicle interior;

a second outflow pipe through which the air containing moisture released by a regeneration process of the dehumidifying device is circulated; and a switching valve provided at a branch portion between the first outflow pipe and the second outflow pipe, the switching valve being capable of switching the flow of the air to the first outflow pipe or the second outflow pipe, wherein a steam trap is provided in the second outflow pipe, and wherein the second outflow pipe merges with the first outflow pipe on a downstream side of the steam trap.

(2)

The vehicle air conditioning system according to (1), wherein the switching valve is a differential pressure valve capable of switching the flow of the air to the first outflow pipe or the second outflow pipe, and wherein the vehicle air conditioning system further comprises:

a first ventilator for controlling the differential pressure valve to switch the flow of the air to the first outflow pipe; and a second ventilator for controlling the differential pressure valve to switch the flow of the air to the second outflow pipe.

(3)

The vehicle air conditioning system according to (1) or (2), wherein the first outflow pipe and the second outflow pipe have a double pipe structure in which the second outflow pipe is disposed within the first outflow pipe at the branch portion between the first outflow pipe and the second outflow pipe.

(4)

The vehicle air conditioning system according to (2) or (3), wherein the first ventilator is disposed in the inflow pipe.

(5)

The vehicle air conditioning system according to any one of (2) to (4), wherein the second ventilator is disposed in the second outflow pipe.

(6)

The vehicle air conditioning system according to any one of (1) to (5), wherein the material having the PTC property comprises barium titanate as a main component.

(7)

The vehicle air conditioning system according to any one of (1) to (6), wherein the dehumidifying layer further comprises an adsorbent having a function of adsorbing at least one selected from carbon dioxide and volatile components, and/or a catalyst.

(8)

The vehicle air conditioning system according to any one of (1) to (7), further comprising a control unit, wherein the control unit can execute:

a dehumidification mode where the vehicle interior is dehumidified by controlling the switching valve to switch the flow of the air to the first outflow pipe; and a regeneration mode where the dehumidifying layer is subjected to a regeneration process by applying a voltage to the pair of electrodes of the dehumidifying device, and controlling the differential pressure valve to switch the flow of the air to the second outflow pipe.

(9)

The vehicle air conditioning system according to (8), further comprising a detection portion capable of detecting fogging of glass in the vehicle interior, wherein the control portion executes the regeneration mode when the fogging of the glass is detected, and the control portion executes the dehumidification mode when the fogging of the glass is not detected.

(10)

The vehicle air conditioning system according to (9), wherein the detection portion detects the fogging of the glass based on a temperature and a humidity in the vehicle interior.

DETAILED DESCRIPTION OF THE INVENTION

Figure 1:
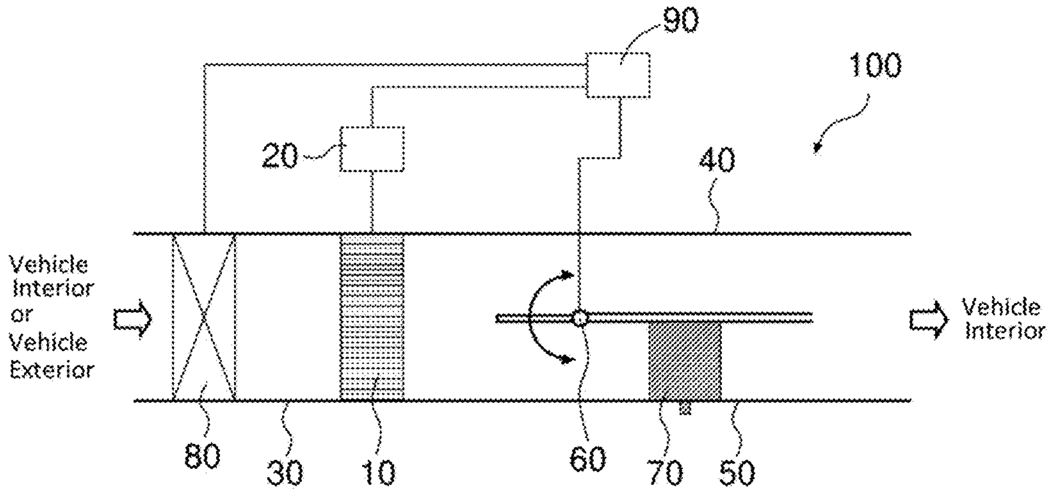
FIG. 1 is a schematic configuration view of a vehicle air conditioning system according to an embodiment of the present invention.

The vehicle air conditioning system according to the present invention includes: a dehumidifying device having: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC (Positive Temperature Coefficient) property; a pair of electrodes provided on the first end face and the second end face; and a dehumidifying layer formed on a surface of each of the partition walls; a power source for applying voltage to the pair of electrodes; an inflow pipe for allowing air from a vehicle interior or a vehicle exterior to flow into the dehumidifying device; a first outflow pipe for returning the air that has been dehumidified by the dehumidifying device to the vehicle interior; a second outflow pipe through which the air containing moisture released by a regeneration process of the dehumidifying device is circulated; and a switching valve provided at a branch portion between the first outflow pipe and the second outflow pipe, the switching valve being capable of switching the flow of the air to the first outflow pipe or the second outflow pipe, wherein a steam trap is provided in the second outflow pipe, and wherein the second outflow pipe merges with the first outflow pipe on a downstream side of the steam trap. By having such a configuration, the vehicle air conditioning system according to the present invention can selectively remove moisture released into the air during the regeneration process using the steam trap. The heated air can then be returned to the interior of the vehicle, so that it can be effectively utilized for purposes such as space heating. Therefore, an energy efficiency can be improved, especially in winter.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

The vehicle air conditioning system according to an embodiment of the present invention can be suitably utilized for various vehicles such as automobiles. The vehicle includes, but not limited to, automobiles and trains. Non-limiting examples of the automobile include a gasoline vehicle, a diesel vehicle, a gas fuel vehicle using CNG (a compressed natural gas) or LNG (a liquefied natural gas), a fuel cell vehicle, an electric vehicle, and a plug-in hybrid vehicle. The vehicle air conditioning system according to the embodiment of the present invention can be particularly suitably used for a vehicle having no internal combustion engine such as electric vehicles and electric railcars.

Figure 2A:
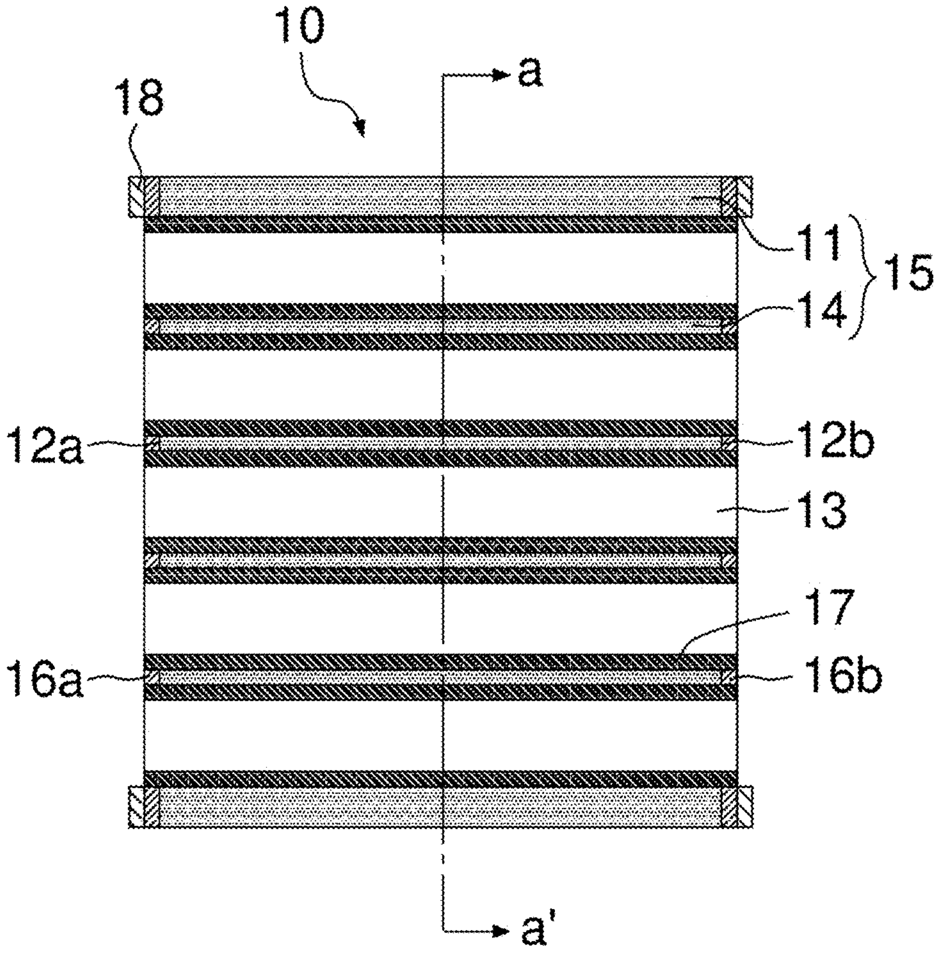
FIG. 2A is a schematic view of a cross section of a dehumidifying device used in a vehicle air conditioning system according to an embodiment of the present invention, which is parallel to a flow path direction.
Figure 2B:
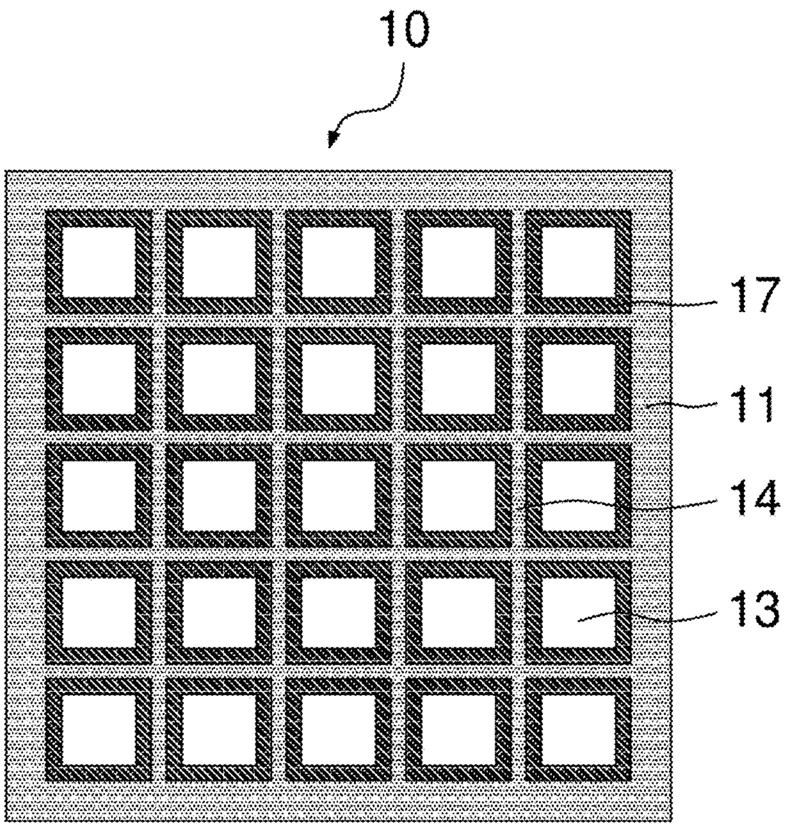
FIG. 2B is a schematic cross-sectional view of the dehumidifying device in FIG. 2A taken along the line a-a'.

FIG. 1 is a schematic configuration view of a vehicle air conditioning system according to an embodiment of the present invention. FIG. 2A is a schematic view of a cross section of a dehumidifying device used in a vehicle air conditioning system according to an embodiment of the present invention, which is parallel to a flow path direction. FIG. 2B is a schematic cross-sectional view of the dehumidifying device in FIG. 2A taken along the line a-a'.

As shown in FIG. 1, a vehicle air conditioning system 100 according to an embodiment of the present invention includes: a dehumidifying device 10; a power source 20; an inflow pipe 30; a first outflow pipe 40; a second outflow pipe 50; a switching valve 60; and a steam trap 70. Also, the vehicle air conditioning system 100 can further include a ventilator 80 for circulating air through pipes (inflow pipe 30, first outflow pipe 40, and second outflow pipe 50), and a control unit 90 for controlling the power source 20, the switching valve 60, the ventilator 80, and the like.

As shown in FIGS. 2A and 2B, the dehumidifying device 10 includes: a honeycomb structure 15 having an outer peripheral wall 11 and partition walls 14 disposed on an inner side of the outer peripheral wall 11 and defining a plurality of cells 13 each extending from a first end face 12*a* to a second end face 12*b* to form a flow path; a pair of electrodes 16*a*, 16*b* provided on the first end face 12*a* and the second end face 12*b*; and a dehumidifying layer 17 formed on a surface of each partition wall 14. The power source 20 can apply a voltage to the pair of electrodes 16*a*, 16*b*. The inflow pipe 30 can allow the air from the vehicle interior or the vehicle exterior to flow into the dehumidifying device 10. The first outflow pipe 40 can return the air dehumidified by the dehumidifying device 10 to the vehicle interior. The second outflow pipe 50 can circulate the air containing moisture released by the regeneration process of the dehumidifying device 10. The switching valve 60 is provided at a branch portion between the first outflow pipe 40 and the second outflow pipe 50, and can switch the flow of the air to the first outflow pipe 40 or the second outflow pipe 50. The steam trap 70 is to remove moisture from the air flowing through the second outflow pipe 50 and is disposed within the second outflow pipe 50. The second outflow pipe 50 merges with the first outflow pipe 40 on the downstream side of the steam trap 70.

In the vehicle air conditioning system 100 having the above configuration, the air from the vehicle interior or the vehicle exterior flows into the dehumidifying device 10 through the inflow pipe 30, and the moisture in the air is trapped (removed) by the dehumidifying layer 17 while the air passes through the dehumidifying device 10. Then, the air with reduced moisture returns to the vehicle interior through the first outflow pipe 40. Such a mode where the moisture contained in the air from the vehicle interior or the vehicle exterior is removed and returned to the vehicle interior refers to a dehumidification mode.

On the other hand, the performance of the dehumidifying layer 17 gradually decreases as an amount of trapped moisture increases. Therefore, the dehumidifying layer 17 must be regenerated. The dehumidifying layer 17 is regenerated by applying a voltage to the pair of electrodes 16*a*, 16*b* to heat the honeycomb structure 15. Since the dehumidifying layer 17 is directly heated by the heating of the honeycomb structure 15, the moisture trapped by the dehumidifying layer 17 is efficiently desorbed or reacted and released from the dehumidifying layer 17. The released air flows into the steam trap 70 through the second outflow pipe 50. The steam trap 70 selectively separates (removes) the moisture in the air and discharges the heated air. The heated air passes through the second outflow pipe 50, merges with the first outflow pipe 40, and returns to the vehicle interior. Such a mode where the dehumidifying layer 17 is regenerated refers to a regeneration mode.

Each component of the vehicle air conditioning system 100 will be described in detail below.

(1. Dehumidifying Device 10)

As shown in FIGS. 2A and 2B, the dehumidifying device 10 includes: a honeycomb structure 15 having an outer peripheral wall 11 and partition walls 14 disposed on an inner side of the outer peripheral wall 11, the partition walls 14 defining a plurality of cells 13 each extending from a first end face 12*a* to a second end face 12*b* to form a flow path; a pair of electrodes 16*a*, 16*b* provided on the first end face 12*a* and the second end face 12*b*; and a dehumidifying layer 17 formed on a surface of each partition wall 14. Also, the dehumidifying device 10 can further include terminals 18 connected to the pair of electrodes 16*a*, 16*b*, if necessary.

(1-1. Honeycomb Structure 15)

The shape of the honeycomb structure 15 is not particularly limited. For example, an outer shape of a cross section of the honeycomb structure 15 orthogonal to the flow path direction (the extending direction of the cells 13) can be polygonal such as quadrangular (rectangular, square), pentagonal, hexagonal, heptagonal, and octagonal, circular, oval (egg-shaped, elliptical, elliptic, rounded rectangular, etc.), or the like. The end faces (first end face 12*a* and second end face 12*b*) have the same shape as the cross section. Also, when the cross section and the end faces are polygonal, the corners may be chamfered.

The shape of each cell 13 is not particularly limited, but it may be polygonal such as quadrangular, pentagonal, hexagonal, heptagonal, and octagonal, circular, or oval in the cross section of the honeycomb structure 15 orthogonal to the flow path direction. These shapes may be alone or in combination of two or more. Moreover, among these shapes, the quadrangle or the hexagon is preferable. By providing the cells 13 having such a shape, it is possible to reduce the pressure loss when the air flows.

The honeycomb structure 15 may be a honeycomb joined body having a plurality of honeycomb segments and joining layers that join outer peripheral side surfaces of the plurality of honeycomb segments together. The use of the honeycomb joined body can increase the total cross-sectional area of the cells 13, which is important for ensuring the flow rate of air, while suppressing cracking.

It should be noted that the joining layer can be formed by using a joining material. The joining material is not particularly limited, but a ceramic material obtained by adding a solvent such as water to form a paste can be used. The joining material may contain a material having the PTC property, or may contain the same material as the outer peripheral wall 11 and the partition walls 14. In addition to the role of joining the honeycomb segments to each other, the joining material can also be used as an outer peripheral coating material after joining the honeycomb segments.

From the viewpoints of ensuring the strength of the honeycomb structure 15, reducing pressure loss when air passes through the cells 13, ensuring the amount of functional material supported, and ensuring the contact area with the air flowing inside the cells 13, it is desirable to suitably combine a thickness of the partition wall 14, a cell density, and a cell pitch (or an opening ratio of the cells 13).

As used herein, the cell density refers a value obtained by dividing a number of cells by an area of one end face (first end face 12*a* or second end face 12*b*) of the honeycomb structure 15 (the total area of the partition walls 14 and the cells 13 excluding the outer peripheral wall 11).

As used herein, the cell pitch refers to a value obtained by the following calculation. First, the area of one end face (first end face 12*a* or second end face 12*b*) of the honeycomb structure 15 (the total area of the partition walls 14 and the cells 13 excluding the outer peripheral wall 11) is divided by the number of the cells to calculate an area per a cell. A square root of the area per a cell is then calculated, and this is determined to be the cell pitch.

As used herein, the opening ratio of the cells 13 refers a value obtained by dividing the total area of the cells 13 defined by the partition walls 14 by the area of one end face 12*b* (first end face 12*a* or second end face 12*b*) (the total area of the partition walls 14 and the cells 13 excluding the outer peripheral wall 11) of the honeycomb structure 15 in the cross section orthogonal to the flow path direction of the honeycomb structure 15. It should be noted that when calculating the opening ratio of the cells 13, the pair of electrodes 16*a*, 16*b*, and the dehumidifying layer 17 are not taken into account.

In an embodiment that is advantageous from the viewpoint of supporting a sufficient amount of functional material, the thickness of the partition wall 14 is 0.300 mm or less, the cell density is 100 cells/$cm^2$ or less, and the cell pitch is 1.0 mm or more. In a preferred embodiment, the thickness of the partition wall 14 is 0.200 mm or less, the cell density is 70 cells/$cm^2$ or less, and the cell pitch is 1.2 mm or more. In a more preferred embodiment, the thickness of the partition wall 14 is 0.130 mm or less, the cell density is 65 cells/$cm^2$ or less, and the cell pitch is 1.3 mm or more.

From the viewpoints of ensuring the strength of the honeycomb structure 15 and maintaining lower electrical resistance, the lower limit of the thickness of the partition wall 14 is preferably 0.010 mm or more, and more preferably 0.020 mm or more, and even more preferably 0.030 mm or more.

From the viewpoints of ensuring the strength of the honeycomb structure 15, maintaining lower electrical resistance, and increasing a surface area to facilitate reaction, adsorption, and release, the lower limit of the cell density is 30 cells/$cm^2$ or more, and preferably 35 cells/$cm^2$ or more, and even more preferably 40 cells/$cm^2$ or more.

From the viewpoints of ensuring the strength of the honeycomb structure 15, maintaining lower electrical resistance and increasing a surface area to facilitate reaction, adsorption and release, the upper limit of the cell pitch is 2.0 mm or less, and more preferably 1.8 mm or less, and even more preferably 1.6 mm or less.

In an embodiment that is advantageous in terms of both reducing pressure loss and maintaining strength, the thickness of the partition wall 14 is 0.08 to 0.36 mm, the cell density is 2.54 to 140 cells/$cm^2$, and the opening ratio of the cells 13 is 0.70 or more. In a preferred embodiment, the thickness of the partition wall 14 is 0.09 to 0.35 mm, the cell density is 15 to 100 cells/$cm^2$, and the opening ratio of the cells 13 is 0.80 or more. In a more preferred embodiment, the thickness of the partition wall 14 is 0.14 to 0.30 mm, the cell density is 20 to 90 cells/$cm^2$, and the opening ratio of the cells 13 is 0.85 or more.

From the viewpoint of ensuring the strength of the honeycomb structure 15, the upper limit of the opening ratio of the cells 13 is preferably 0.94 or less, and more preferably 0.92 or less, and even more preferably 0.90 or less.

Although the thickness of the outer peripheral wall 11 is not particularly limited, it is preferably determined based on the following viewpoints. First, from the viewpoint of reinforcing the honeycomb structure 15, the thickness of the outer peripheral wall 11 is preferably 0.05 mm or more, and more preferably 0.06 mm or more, and even more preferably 0.08 mm or more. On the other hand, the thickness of the outer peripheral wall 11 is preferably 1.0 mm or less, and more preferably 0.5 mm, and more preferably 0.4 mm or less, and still more preferably 0.3 mm or less, from the viewpoint of suppressing the initial current by increasing the electrical resistance and from the viewpoint of reducing pressure loss when air flows.

As used herein, the thickness of the outer peripheral wall 11 refers to a length from a boundary between the outer peripheral wall 11 and the outermost cell 13 or the partition wall 14 to a side surface of the honeycomb structure 15 in a normal line direction of the side surface in the cross section orthogonal to the flow path direction.

The length in the flow path direction and the cross-sectional area orthogonal to the flow path direction of the honeycomb structure 15 may be adjusted according to the required size of the dehumidifying device 10, and are not particularly limited. For example, when used in a compact dehumidifying device 10 while ensuring a predetermined function, the honeycomb structure 15 can have a length of 2 to 20 mm in the flow path direction and a cross-sectional area of 10 $cm^2$ or more orthogonal to the flow path direction. Although the upper limit of the cross-sectional area orthogonal to the flow path direction is not particularly limited, it is, for example, 300 $cm^2$.

The partition walls 14 forming the honeycomb structure 15 are made of a material that can be heated by electric conduction, specifically made of a material having the PTC property. Further, the outer peripheral wall 11 may also be made of the material having the PTC property, as with the partition walls 14, as needed. By such a configuration, the dehumidifying layer 17 can be directly heated by heat transfer from the heat-generating partition walls 14 (and optionally the outer peripheral wall 11). Further, the material having the PTC property has characteristics such that when the temperature increases to exceed the Curie point, the resistance value is sharply increased, resulting in a difficult for electricity to flow. Therefore, when the temperature of the partition walls 14 (and the outer peripheral wall 11 if necessary) becomes high, the current flowing through them is limited, thereby suppressing excessive heat generation of the honeycomb structure 15. Therefore, it is possible to suppress thermal deterioration of the dehumidifying layer 17 due to excessive heat generation.

The lower limit of the volume resistivity at 25° C. of the material having the PTC property is preferably 0.5 Ω·cm or more, and more preferably 1 Ω·cm or more, and even more preferably 5 Ω·cm or more, from the viewpoint of obtaining appropriate heat generation. The upper limit of the volume resistivity at 25° C. of the material having the PTC property is preferably 30 Ω·cm or less, and more preferably 18 Ω·cm or less, and even more preferably 16 Ω·cm or less, from the viewpoint of generating heat with a low driving voltage. As used herein, the volume resistivity at 25° C. of the material having the PTC property is measured according to JIS K 6271:2008.

From the viewpoints that can be heated by electric conduction and has the PTC property, the outer peripheral wall 11 and the partition walls 14 are preferably made of a material containing barium titanate ($BaTiO_3$) as a main component. Also, this material is more preferably ceramics made of a material containing barium titanate ($BaTiO_3$)-based crystals as a main component in which a part of Ba is substituted with a rare earth element. As used herein, the term "main component" means a component in which a proportion of the component is more than 50% by mass of the total component. The content of $BaTiO_3$-based crystalline particles can be determined by fluorescent X-ray analysis. Other crystalline particles can also be measured by the same method.

The compositional formula of $BaTiO_3$-based crystalline particles, in which a part of Ba is substituted with the rare earth element, can be expressed as $(Ba_{1-x}A_x)TiO_3$. In the compositional formula, the symbol A represents at least one rare earth element, and $0.001 \leq x \leq 0.010$.

The symbol A is not particularly limited as long as it is the rare earth element, but it may preferably be one or more selected from the group consisting of La, Ce, Pr, Nd, Eu, Gd, Dy, Ho, Er, Y and Yb, and more preferably La. The x value is preferably 0.001 or more, and more preferably 0.0015 or more, in terms of suppressing excessively high electrical resistance at room temperature. On the other hand, x is preferably 0.009 or less, in terms of preventing the electrical resistance at room temperature from becoming too high due to insufficient sintering.

The content of the $BaTiO_3$-based crystalline particles in which a part of Ba is substituted with the rare earth element in the ceramics is not particularly limited as long as it is determined to be the main component, but it may preferably be 90% by mass or more, and more preferably 92% by mass or more, and even more preferably 94% by mass or more. The upper limit of the content of the $BaTiO_3$-based crystalline particles is not particularly limited, but it may generally be 99% by mass, and preferably 98% by mass.

The content of the $BaTiO_3$-based crystalline particles can be measured by fluorescent X-ray analysis. Other crystalline particles can be measured in the same manner as this method.

In terms of reduction of the environmental load, it is desirable that the materials used for the outer peripheral wall 11 and the partition walls 14 are substantially free of lead (Pb). More particularly, the outer peripheral wall 11 and the partition walls 14 preferably have a Pb content of 0.01% by mass or less, and more preferably 0.001% by mass or less, and still more preferably 0% by mass. The lower Pb content can allow the air heated by contact with the heat-generating partition walls 14 to be safely applied to organisms such as humans, for example. In the outer peripheral wall 11 and the partition walls 14, the Pb content is preferably less than 0.03% by mass, and more preferably less than 0.01% by mass, and further preferably 0% by mass, as converted to PbO. The lead content can be determined by ICP-MS (inductively coupled plasma mass spectrometry).

The material making up the outer peripheral wall 11 and the partition walls 14 preferably has a Curie point in a temperature range where the resistance value becomes twice or more the resistance value at room temperature (25° C.). If the Curie point is in such a temperature range, the current flowing through the dehumidifying device 10 is limited when the dehumidifying device 10 reaches a high temperature, so that excessive heat generation of the dehumidifying device 10 is efficiently suppressed. Therefore, thermal deterioration of the dehumidifying layer 17 caused by excessive heat generation can be suppressed.

The material making up the outer peripheral wall 11 and the partition walls 14 preferably have a lower limit of a Curie point of 80° C. or more, and more preferably 100° C. or more, and even more preferably 110° C. or more, and still more preferably 125° C. or more, in terms of efficiently heating the dehumidifying layer 17. Further, the upper limit of the Curie point is preferably 200° C. or more, and preferably 190° C. or more, and even more preferably 180° C. or more, and particularly preferably 150° C. or more, in terms of safety as a component placed in the vehicle interior or near the vehicle interior.

The Curie point of the material making up the outer peripheral wall 11 and the partition walls 14 can be adjusted by the type of shifter and an amount of the shifter added. For example, the Curie point of barium titanate ($BaTiO_3$) is about 120° C., but the Curie point can be shifted to the lower temperature side by substituting a part of Ba and Ti with one or more of Sr, Sn and Zr.

As used herein, the Curie point is measured by the following method. A sample is attached to a sample holder for measurement, mounted in a measuring tank (e.g., MINI-SUBZERO MC-810P, from ESPEC), and a change in electrical resistance of the sample as a function of a temperature change when the temperature is increased from 10° C. is measured using a DC resistance meter (e.g., Multimeter 3478A, from YOKOGAWA HEWLETT PACKARD, LTD.). Based on an electrical resistance-temperature plot obtained by the measurement, a temperature at which the resistance value is twice the resistance value at room temperature (20° C.) is defined as the Curie point.

(1-2. Pair of Electrodes 16*a*, 16*b*)

As shown in FIG. 2A, the pair of electrodes 16*a*, 16*b* are provided on the first end face 12*a* and the second end face 12*b*.

Applying of a voltage between the pair of electrodes 16*a*, 16*b* allows the honeycomb structure 15 to generate heat by Joule heat.

The pair of electrodes 16*a*, 16*b* may employ, for example, a metal or alloy containing at least one selected from Cu, Ag, Al, Ni and Si, although not particularly limited thereto. It is also possible to use an ohmic electrode capable of ohmic contact with the outer peripheral wall 11 and/or the partition walls 14 which have the PTC property. The ohmic electrode may employ an ohmic electrode containing, for example, at least one selected from Al, Au, Ag and In as a base metal, and containing at least one selected from Ni, Si, Zn, Ge, Sn, Se and Te for n-type semiconductors as a dopant. Further, the pair of electrodes 16*a*, 16*b* may have a single-layer structure, or may have a laminated structure of two or more layers. When the pair of electrodes 16*a*, 16*b* have the laminated structure of two or more layers, the materials of the respective layers may be of the same type or of different types.

The thickness of the pair of electrodes 16*a*, 16*b* may be appropriately set according to the method for forming the pair of electrodes 16*a*, 16*b*. The method for forming the pair of electrodes 16a, 16b includes metal deposition methods such as sputtering, vapor deposition, electrolytic deposition, and chemical deposition. Alternatively, the pair of electrodes 16a, 16b can be formed by applying an electrode paste and then baking it, or by thermal spraying. Furthermore, the pair of electrodes 16a, 16b may be formed by joining metal sheets or alloy sheets.

Each of the thicknesses of the pair of electrodes 16a, 16b is, for example, about 5 to 80 μm for baking the electrode paste, and about 100 to 1000 nm for dry plating such as sputtering and vapor deposition, and about 10 to 100 μm for thermal spraying, and about 5 μm to 30 μm for wet plating such as electrolytic deposition and chemical deposition. Further, when joining the metal sheet or alloy sheet, each of the thicknesses is preferably about 5 to 100 μm.

(1-3. Terminal 18)

The terminals 18 are connected to the pair of electrodes 16a, 16b and provided on at least a part of the pair of electrodes 16a, 16b. The provision of the terminals 18 facilitates connection to an external power source. The terminals 18 are connected to conducing wires connected to the power source 20.

The terminals 18 may be made of any material, including, but not particularly limited to, a metal, for example. The metal that can be used herein may include single metals, alloys, and the like, but from the viewpoint of corrosion resistance, electrical resistivity, and coefficient of linear expansion, it may preferably be alloys containing at least one selected from the group consisting of Cr, Fe, Co, Ni, Cu, Al, and Ti, and more preferably stainless steel, Fe—Ni alloy, and phosphor bronze.

The size and shape of the terminal 18 are not particularly limited. For example, as shown in FIG. 2A, the terminals 18 can be provided on the whole of the pair of electrodes 16a, 16b on the outer peripheral wall 11. Further, the terminals 18 may be provided on a part of the pair of electrodes 16a, 16b on the outer peripheral wall 11, or may be provided so as to extend toward an outer side than the outer edge of each of the pair of electrodes 16a, 16b on the outer peripheral wall 11. Further, the terminals 18 may be provided on a part of the pair of electrodes 16a, 16b on the partition walls 14, or may be provided so as to block a part of the cells 13.

Furthermore, the thickness of the terminal 18 is not particularly limited, but it is, for example, 0.01 to 10 mm, typically 0.05 to 5 mm.

The method of connecting the terminals 18 to the pair of electrodes 16a, 16b is not particularly limited as long as they are electrically connected. For example, they can be connected by diffusion bonding, a mechanical pressing mechanism, welding, or the like.

(1-4. Dehumidifying Layer 17)

The dehumidifying layer 17 can be provided on the surfaces of the partition walls 14 (in the case of the outermost cells 13, the partition walls 14 that define the outermost cells 13 and the outer peripheral wall 11). By thus providing the dehumidifying layer 17, the dehumidifying layer 17 can be easily heated during the regeneration process, so that the moisture adsorbing function by the dehumidifying layer 17 can be regenerated.

The dehumidifying layer 17 contains a dehumidifying material. The dehumidifying material is not particularly limited, but a moisture absorbent can be used.

The moisture adsorbent preferably has a function that can adsorb the moisture (water vapor) at −20 to 40° C. and release them at an elevated temperature of 60° C. or more. Examples of the moisture absorbent having such a function include aluminosilicate, silica gel, silica, graphene oxide, polymer moisture absorbents, polystyrene sulfonic acid, and metal organic frameworks (MOFs: Metal Organic Frameworks). These may be used alone or in combination of two or more.

Examples of the aluminosilicate that can be preferably used herein include AFI type-, CHA type-, or BEA type-zeolite; and porous clay minerals such as allophane and imogolite. Also, it is more preferable that the aluminosilicate is amorphous.

Examples of the silica gel that can be preferably used herein include type A silica gel.

Examples of the polymer moisture adsorbents that can be preferably used herein include those having a polyacrylic acid polymer chain. For example, sodium polyacrylate or the like can be used as the polymer moisture adsorbent.

The metal organic framework is a crystalline hybrid material containing metal ions and organic molecules (organic ligands). The metal ions are preferably hydrophilic metal ions (for example, aluminum ions).

The dehumidifying layer 17 can contain a functional material other than the dehumidifying material, and/or a catalyst. The functional material other than the dehumidifying material is not particularly limited as long as it can exhibit the desired function, but an adsorbent, a catalyst, and the like can be used. The adsorbent preferably has a function of adsorbing at least one selected from carbon dioxide and volatile components. Also, the use of the catalyst allows the components to be removed to be purified. Furthermore, the adsorbent and the catalyst may be used together for the purpose of enhancing the function of the absorbent to capture the components to be removed.

Examples of the adsorbent include zeolite, silica gel, activated carbon, alumina, silica, low-crystalline clay, amorphous aluminum silicate complexes, and the like. Some of these components also function as the dehumidifying material. The adsorbent may be used alone, or in combination with two or more types.

The catalyst preferably has a function capable of promoting the oxidation-reduction reaction. The catalysts having such functions include metal catalysts such as Pt, Pd and Ag, and oxide catalysts such as $CeO_2$ and $ZrO_2$. The catalyst may be used alone, or in combination with two or more types.

The volatile components contained in the air in the vehicle interior include, for example, volatile organic compounds (VOCs), and odor components other than the VOCs Specific examples of the volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, and di-2-ethylhexyl phthalate, diazinon, acetaldehyde, 2-(1-methylpropyl)phenyl N-methylcarbamate, and the like.

The thickness of the dehumidifying layer 17 may be determined according to the size of the cells 13, and is not particularly limited. For example, the thickness of the dehumidifying layer 17 is preferably 20 μm or more, and more preferably 25 μm or more, and even more preferably 30 μm or more, from the viewpoint of ensuring sufficient contact with air. On the other hand, the thickness of the dehumidifying layer 17 is preferably 400 μm or less, and more preferably 380 μm or less, and even more preferably 350 μm or less, from the viewpoint of suppressing separation of the dehumidifying layer 17 from the partition walls 14 and the outer peripheral wall 11.

The thickness of the dehumidifying layer 17 is measured using the following procedure. Any cross section parallel to the flow path direction of the honeycomb structure 15 is cut out, and a cross-sectional image at magnifications of about 50 is acquired using a scanning electron microscope or the like. Also, this cross section is made to pass through the center of gravity position in the cross section orthogonal to the flow path of the honeycomb structure 15. The thickness of each dehumidifying layer 17 visually recognized from the cross-sectional image is calculated by dividing the cross-sectional area by the length of the cells 13 in the flow path direction. This calculation is performed for all the dehumidifying layers 17 visually recognized from the cross-sectional image, and an average value thereof is determined to be the thickness of the dehumidifying layer 17.

From the viewpoint that the functional material and the like exhibit the desired function in the dehumidifying device 10, an amount of the dehumidifying layer 17 is preferably 50 to 500 g/L, and more preferably 100 to 400 g/L, and even more preferably 150 to 350 g/L, based on the volume of the honeycomb structure 15. It should be noted that the volume of the honeycomb structure 15 is a value determined by the external dimensions of the honeycomb structure 15.

(1-5. Method for Producing Dehumidifying Device 10)

The method for producing the dehumidifying device 10 is not particularly limited, and it can be performed according to a known method. Hereinafter, the method for producing the dehumidifying device 10 will be illustratively described.

A method for producing the honeycomb structure 15 forming the dehumidifying device 10 includes a forming step and a firing step.

In the forming step, a green body containing a ceramic raw material including $BaCO_3$ powder, $TiO_2$ powder, and rare earth nitrate or hydroxide powder is formed to prepare a honeycomb formed body having a relative density of 60% or more.

The ceramic raw material can be obtained by dry-mixing the powders so as to have a desired composition.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the honeycomb formed body is 60% or more.

As used herein, the "relative density of the honeycomb formed body" means a ratio of the density of the honeycomb formed body to the true density of the entire ceramic raw material. More particularly, the relative density can be determined by the following equation:

$$\text{relative density of honeycomb formed body (\%)} = \text{density of honeycomb formed body (g/cm}^3\text{)} / \text{true density of entire ceramic raw material (g/cm}^3\text{)} \times 100.$$

The density of the honeycomb formed body can be measured by the Archimedes method using pure water as a medium. Further, the true density of the entire ceramic raw material can be obtained by dividing the total mass of the respective raw materials (g) by the total volume of the actual volumes of the respective raw materials ($cm^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The honeycomb formed body can be produced by extrude the green body. In the extrusion, a die having a desired overall shape, cell shape, partition wall thickness, cell density and the like can be used.

The relative density of the honeycomb formed body obtained by extrusion is 60% or more, and preferably 65% or more. By controlling the relative density of the honeycomb formed body to such a range, the honeycomb formed body can be densified and the electrical resistance at room temperature can be reduced. The upper limit of the relative density of the honeycomb formed body is not particularly limited, but it may generally be 80%, and preferably 75%.

The honeycomb formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the formed body at a temperature of from 1150 to 1250° C., and then increasing the temperature to a maximum temperature of from 1360 to 1430° C. at a heating rate of 20 to 600° C./hour, and maintaining the temperature for 0.5 to 10 hours.

The maintaining of the honeycomb formed body at the maximum temperature of from 1360 to 1430° C. for 0.5 to 10 hours can provide the honeycomb structure 15 containing, as a main component, $BaTiO_3$-based crystal particles in which a part of Ba is substituted with the rare earth element.

Further, the maintaining at the temperature of from 1150 to 1250° C. can allow the $Ba_2TiO_4$ crystal particles generated in the firing process to be easily removed, so that the honeycomb structure 15 can be densified.

Further, the heating rate of 20 to 600° C./hour from the temperature of 1150 to 1250° C. to the maximum temperature of 1360 to 1430° C. can allow 1.0 to 10.0% by mass of $Ba_6Ti_{17}O_{40}$ crystal particles to be formed in the honeycomb structure 15.

The maintaining time at 1150 to 1250° C. is not particularly limited, but it may preferably be from 0.5 to 10 hours. Such a maintaining time can lead to stable and easy removal of $Ba_2TiO_4$ crystal particles generated in the firing process.

The firing step preferably includes maintaining at 900 to 950° C. for 0.5 to 5 hours during the increasing of the temperature. The maintaining at 900 to 950° C. for 0.5 to 5 hours can lead to sufficient decomposition of $BaCO_3$, so that the honeycomb structure 15 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of control of electrical characteristics and production cost.

A firing furnace used in the firing step and the degreasing step is not particularly limited, but it may be an electric furnace, a gas furnace, or the like.

On the honeycomb structure 15 thus obtained, the pair of electrodes 16*a*, 16*b* are formed. The pair of electrodes 16*a*, 16*b* can be formed by metal deposition methods such as sputtering, vapor deposition, electrolytic deposition, and chemical deposition. Further, the pair of electrodes 16*a*, 16*b* can also be formed by applying an electrode paste and then baking it. Furthermore, the pair of electrodes 16*a*, 16*b* can also be formed by thermal spraying. The pair of electrodes 16*a*, 16*b* may be composed of a single layer, but may also be composed of a plurality of electrode layers having different compositions. A typical method for forming the pair of electrodes 16*a*, 16*b* will be described below.

First, an electrode slurry containing an electrode material, an organic binder, and a dispersion medium is prepared, and the first end face 12*a* or the second end face 12*b* of the honeycomb structure 15 is coated with the slurry. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. An excess slurry on the periphery of the honeycomb structure 15 is removed by blowing and wiping. The slurry can be then dried to form the pair of electrodes 16*a*, 16*b* on the first end face 12*a* or the second end face 12*b* of the honeycomb structure 15. The drying can be performed while heating the vehicle air conditioning system to a temperature of about 120 to 600° C., for example. Although a series of steps of coating, slurry removal, and drying may be performed only once, the steps can be repeated multiple times to provide the pair of electrodes 16*a*, 16*b* having desired thicknesses.

When the terminals 18 are provided, they are then disposed at predetermined positions of the pair of electrodes 16*a*, 16*b*, and the pair of electrodes 16*a*, 16*b* and the terminals 18 are connected to each other. As a method of connecting the pair of electrodes 16*a*, 16*b* to the terminals 18, the method described above can be used.

It should be noted that the terminals 18 may be disposed after forming a dehumidifying layer 17 described below.

The dehumidifying layer 17 is then formed on the surfaces of the partition walls 14 and the like of the honeycomb structure 15.

Although the method for forming the dehumidifying layer 17 is not particularly limited, it can be formed, for example, by the following steps. The honeycomb structure 15 is immersed in a slurry containing a dehumidifying material, an organic binder, and a dispersion medium for a predetermined period of time, and an excess slurry on the end faces and the outer periphery of the honeycomb structure 15 is removed by blowing and wiping. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. The slurry can be then dried to form the dehumidifying layer 17 on the surfaces of the partition walls 14. The drying can be performed while heating the honeycomb structure 15 to a temperature of about 120 to 600° C., for example. Although a series of steps of immersion, slurry removal, and drying may be performed only once, the steps can be repeated multiple times to provide the dehumidifying layer 17 having the desired thickness on the surfaces of the partition walls 14 and the like.

(2. Power Source 20)

The power source 20 is for applying a voltage to the pair of electrodes 16*a*, 16*b*. The power source 20 is electrically connected to the control unit 90, and adjusts the state of the voltage applied to the pair of electrodes 16*a*, 16*b* according to instructions from the control unit 90.

The power source 20 is not particularly limited, and a battery or the like can be used.

(3. Inflow Pipe 30)

The inflow pipe 30 is a pipe for allowing the air from the vehicle interior or the vehicle exterior to flow into the dehumidifying device 10.

The shape and size of the inflow pipe 30 may be adjusted as needed depending on the type of the vehicle, and they are not particularly limited.

(4. First Outflow Pipe 40 and Second Outflow Pipe 50)

Both of the first outflow pipe 40 and the second outflow pipe 50 are pipes for circulating the air that passed through the dehumidifying device 10. In particular, the first outflow pipe 40 is a pipe for returning the air that has been dehumidified by the dehumidifying device 10 to the vehicle interior, and the second outflow pipe 50 is a pipe for circulating the air containing moisture released by the regeneration process of the dehumidifying device 10.

The shape, size and the like of the first outflow pipe 40 and the second outflow pipe 50 may be adjusted as needed depending on the type of the vehicle, and they are not particularly limited. Further, the first outflow pipe 40 and the second outflow pipe 50 may be separate pipes from the inflow pipe 30, or may be pipes formed integrally with the inflow pipe 30.

The second outflow pipe 50 merges with the first outflow pipe 40 on the downstream side of the steam trap 70. Such a configuration allows the heated air from which the moisture has been removed by the steam trap 70 to be returned to the first outflow pipe 40, so that it can be effectively used for space heating and the like.

Figure 3:
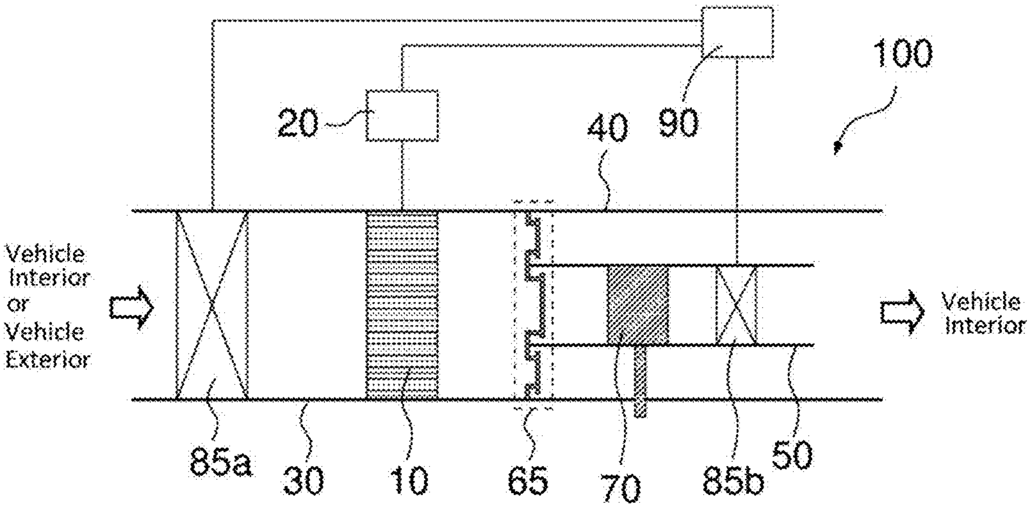
FIG. 3 is a schematic configuration view of a vehicle air conditioning system according to another embodiment of the present invention.

As shown in FIG. 3, the first outflow pipe 40 and the second outflow pipe 50 may have a double pipe structure in which the second outflow pipe 50 is disposed within the first outflow pipe 40 at a branch portion between the first outflow pipe 40 and the second outflow pipe 50. Such a configuration allows the structure around the branch portion between the first outflow pipe 40 and the second outflow pipe 50 to be made compact, and also allows a commercially available differential pressure valve 65 as described below to be used at the branch portion. It should be noted that FIG. 3 is a schematic configuration view of a vehicle air conditioning system according to another embodiment of the present invention.

(5. Switching Valve 60)

The switching valve 60 is provided at a branch point between the first outflow pipe 40 and the second outflow pipe 50 and has a function of switching the flow of the air to the first outflow pipe 40 or the second outflow pipe 50.

The switching of the switching valve 60 can be performed, for example, by electrically connecting the control unit 90 and the switching valve 60 by wire or wirelessly, and operating the switch of the switching valve 60 using the control unit 90.

The switching valve 60 is not particularly limited as long as it is electrically driven and has a function of switching flow paths, and examples of the switching valve include electromagnetic valves and electric valves. For example, the switching valve 60 can include an opening and closing door supported by a rotating shaft and an actuator such as a motor for rotating the rotating shaft. The actuator is configured to be controllable by the control unit 90.

The switching valve 60 is preferably a differential pressure valve 65 that can switch the flow of the air to the first outflow pipe 40 or the second outflow pipe 50, as shown in FIG. 3. The use of the differential pressure valve 65 eliminates the need for providing the driving portion (for example, the actuator) around the switching valve 60, so that the structure around the branch portion can be made compact.

The differential pressure valve 65 is not particularly limited as long as it can be disposed at the branch portion between the first outflow pipe 40 and the second outflow pipe 50, and can open and close the flow path of the first outflow pipe 40 or the second outflow pipe 50 depending on the pressure inside the pipe.

Figure 4A:
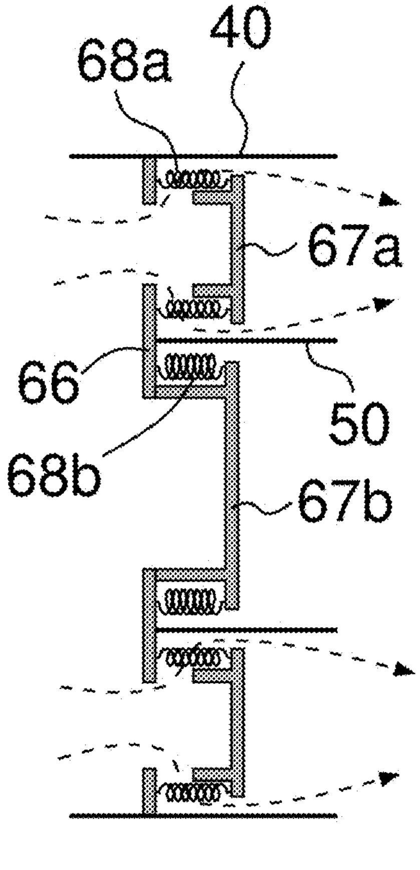
FIG. 4A is a partially enlarged view showing a state of a differential pressure valve in a dehumidification mode.
Figure 4B:
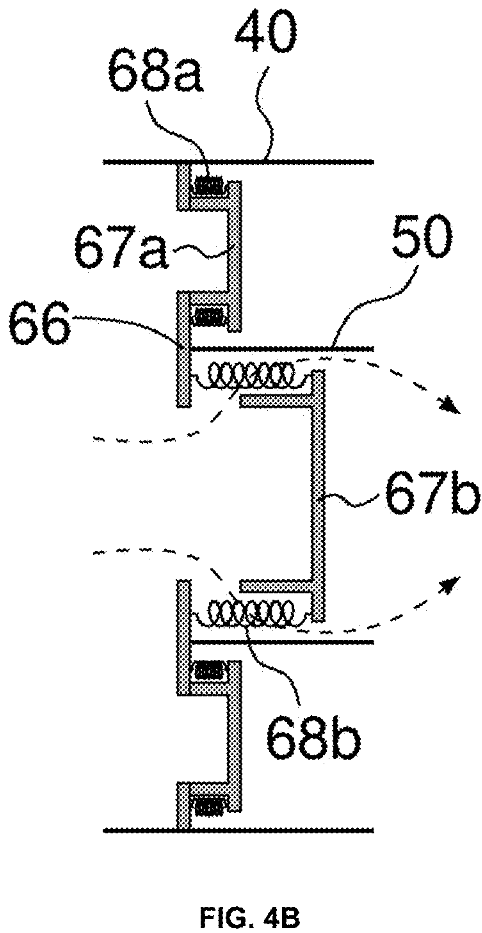
FIG. 4B is a partially enlarged view showing a state of a differential pressure valve in a regeneration mode.

For example, as shown in FIGS. 4A and 4B, the differential pressure valve 65 includes: a base portion 66; opening and closing portions 67*a*, 67*b*; and spring portions 68*a*, 68*b* connecting the base portion 66 to the opening and closing portions 67*a*, 67*b*. The differential pressure valve 65 having such a structure can control the pressure for opening the opening and closing portions 67*a*, 67*b* by adjusting the strength of the spring portions 68*a*, 68*b*.

(6. Steam Trap 70)

The steam trap 70 is a self-powered valve that automatically removes moisture (condensed water) from the air containing moisture released by the regeneration process of the dehumidifying device 10. The steam trap 70 has a mechanism that opens a valve to discharge the condensed water when condensed water accumulates, and closes the valve when the condensed water disappears. By arranging the steam trap 70 within the second outflow pipe 50, the moisture can be selectively removed from the air containing moisture released by the regeneration process of the dehumidifying device 10.

The type of the steam trap 70 is not particularly limited, and any known steam trap may be used. Examples of the steam trap that can be used herein include mechanical traps that operate a valve using buoyant force of a float using a difference in specific gravity between steam and condensed water, thermostatic traps that operate a valve with expansion and contraction force of a temperature sensing element using a temperature difference between steam and condensed water, and thermodynamic traps that operate a valve using hydrodynamic and thermodynamic characteristics resulting from a difference in flow velocity between steam and condensed water. Since such a steam trap 70 is commercially available, it is possible to use a commercially available product.

(7. Ventilator 80)

The ventilator 80 is provided to circulate the air through the pipes (the inflow pipe 30, the first outflow pipe 40, and the second outflow pipe 50). The ventilator 80 is not particularly limited, and any known ventilator can be used. The position of the ventilator 80 is not particularly limited, and it may be provided in the inflow pipe 30 as shown in FIG. 1, but it may be provided in the outflow pipe (for example, at a position on a downstream side of the merging portion between the first outflow pipe 40 and the second outflow pipe 50, or both in the first outflow pipe 40 and the second outflow pipe 50, and the like).

When the differential pressure valve 65 is used as the switching valve 60, as shown in FIG. 3, it is provided with a first ventilator 85*a* to control the differential pressure valve 65 to switch the flow of the air to the first outflow pipe 40, and a second ventilator 85*b* to control the differential pressure valve 65 to switch the flow of the air to the second outflow pipe 50. Specifically, the first ventilator 85*a* is provided to control the opening and closing portion 67*a* of the differential pressure valve 65 to an opened state, and the second ventilator 85*b* is provided to control the opening and closing portion 67*b* of the differential pressure valve 65 to an opened state. The first ventilator 85*a* and the second ventilator 85*b* are not particularly limited, and any known ventilators can be used.

Here, FIG. 4A illustrates a partially enlarged view showing the state of the differential pressure valve 65 in the dehumidification mode, and FIG. 4B illustrates a partially enlarged view showing the state of the differential pressure valve 65 in the regeneration mode.

In the dehumidification mode, the differential pressure valve 65 is controlled to switch the flow of the air to the first outflow pipe 40, as shown in FIG. 4A, by stopping the second ventilator 85*b* and activating the first ventilator 85*a*. Also, in the regeneration mode, the differential pressure valve 65 is controlled to switch the flow of the air to the second outflow pipe 50, as shown in FIG. 4B, by stopping the first ventilator 85*a* and activating the second ventilator 85*b*.

The position of the first ventilator 85*a* is not particularly limited as long as it is a position where the differential pressure valve 65 can be controlled as described above.

For example, the first ventilator 85*a* can be disposed within the inflow pipe 30. When the first ventilator 85*a* is disposed at such a position, the interior of the pipe on the upstream side of the differential pressure valve 65 becomes positive pressure when the first ventilator 85*a* is activated. Due to the positive pressure, only the opening and closing portion 67*a* of the differential pressure valve 65 becomes opened, and the air flows into the first outflow pipe 40.

In order to open only the opening and closing portion 67*a* of the differential pressure valve 65 by the positive pressure, the spring portion 68*a* may be set to the strength sufficient to open that portion by the positive pressure, and the spring portion 68*b* may be set to the strength sufficient not to open that portion by the positive pressure.

Further, the first ventilator 85*a* may be disposed within the first outflow pipe 40 on the downstream side of the differential pressure valve 65 (at a position on an upstream side of the merging position with the second outflow pipe 50). When the first ventilator 85*a* is disposed at such a position, the interior of the first outflow pipe 40 between the differential pressure valve 65 and the first ventilator 85*a* becomes negative pressure when the first ventilator 85*a* is activated. Due to the negative pressure, only the opening and closing portion 67*a* of the differential pressure valve 65 becomes opened, and the air flows into the first outflow pipe 40. In this case, the strengths of the spring portion 68*a* and the spring portion 68*b* of the differential pressure valve 65 may be approximately the same.

The position of the second ventilator 85*b* is not particularly limited as long as it is a position where the differential pressure valve 65 can be controlled as described above.

For example, the second ventilator 85*b* can be disposed within the second outflow pipe 50 (at a position on an upstream side of the merging position with the first outflow pipe 40). When the second ventilator 85*b* is disposed at such a position, the interior of the second outflow pipe 50 between the differential pressure valve 65 and the second ventilator 85*b* becomes negative pressure when the second ventilator 85*b* is activated. Due to the negative pressure, only the opening and closing portion 67*b* of the differential pressure valve 65 becomes opened, and the air flows into the second outflow pipe 50.

(8. Control Unit 90)

The control unit 90 can be provided to control the power source 20, the switching valve 60, the ventilator 80 (the first ventilator 85*a*, and the second ventilator 85*b*), and the like. The control unit 90 is electrically connected to the power source 20, the switching valve 60, the ventilator 80 (the first ventilator 85*a*, the second ventilator 85*b*), and the like.

The control unit 90 can adjust the heating state of the honeycomb structure 15 by controlling the power source 20 for applying the voltage to the pair of electrodes 16*a*, 16*b* of the dehumidifying device 10.

The control unit 90 can switch the flow of the air to the first outflow pipe 40 or the second outflow pipe 50 by controlling the switching valve 60.

The control unit 90 can circulate the air through the pipe by activating the ventilator 80.

When the differential pressure valve 65 is used as the switching valve 60, the control unit 90 can be controlled to activate the first ventilator 85*a* and switch the flow of the air at the differential pressure valve 65 to the first outflow pipe 40. Further, the control unit 90 can be controlled to activate the second ventilator 85*b* and switch the flow of the air at the differential pressure valve 65 to the second outflow pipe 50.

The control unit 90 is generally an ECU (Engine (electronic) Control Unit), although not particularly limited thereto. The ECU includes a CPU for performing various calculation processes, a ROM for storing programs and data required for its control, a RAM for temporarily storing results of calculations performed by the CPU, and input/output ports for inputting and outputting signals to and from the outside.

The control unit 90 can preferably execute both the dehumidification mode where the vehicle interior is dehumidified by controlling the switching valve 60 to switch the flow of the air to the first outflow pipe 40; and the regeneration mode where the dehumidifying layer 17 is subjected to a regeneration process by applying a voltage to the pair of electrodes 16*a*, 16*b* of the dehumidifying device 10, and controlling the switching valve 60 to switch the flow of the air to the second outflow pipe 50. In particular, when the switching valve 60 is the differential pressure valve 65, the control unit 90 can preferably actuate both a dehumidification mode where the vehicle interior is dehumidified by activating the first ventilator 85*a* and controlling the differential pressure valve 65 to switch the flow of the air to the first outflow pipe 40; and a regeneration mode where the dehumidifying layer 17 is subjected to a regeneration process by activating the second ventilator 85*b*, and applying a voltage to the pair of electrodes 16*a*, 16*b* of the dehumidifying device 10, and controlling the differential pressure valve 65 to switch the flow of the air to the second outflow pipe 50. If such modes are executable, the moisture contained in the air from the vehicle interior can be removed and returned to the vehicle interior in the dehumidification mode, and the heated air can be returned to the vehicle interior while discharging the moisture trapped in the dehumidifying layer 17 by the steam trap 70 in the regeneration mode.

The vehicle air conditioning system 100 further includes a detection portion (not shown) capable of detecting fogging of the glass in the vehicle interior, and it is preferable that the control unit 90 executes the regeneration mode when the fogging of the glass in the vehicle interior is detected, and executes the dehumidification mode when the fogging of the glass in the vehicle is not detected. Such a control allows the regeneration process of the dehumidifying layer 17 to proceed efficiently, while suppressing the fogging of the glass in the vehicle interior.

The detection portion capable of detecting the fogging of the glass in the vehicle interior is not particularly limited, but it is preferable to detect the fogging of the glass in the vehicle interior based on the temperature and humidity in the vehicle interior. The detection portion having such a function can stably detect the fogging of the glass.

In the regeneration mode of the dehumidifying layer 17, the dehumidifying layer 17 is preferably heated to a temperature higher than the desorption temperature depending on the type of the dehumidifying material in order to promote the release of the moisture captured in the dehumidifying layer 17. For example, the dehumidifying layer 17 is preferably heated to 70 to 150° C., and more preferably 80 to 140° C., and even more preferably heated to 90 to 130° C.

From the viewpoint of stably performing the above control, it is desirable that the dehumidifying device 10 be placed at a position close to the vehicle interior. Therefore, from the viewpoint of preventing electric shock and the like, it is preferable that the driving voltage of the dehumidifying device 10 is 60V or less. Since the honeycomb structure 15 used in the dehumidifying device 10 has a low electrical resistance at room temperature, the honeycomb structure 15 can be heated at the low driving voltage. It should be noted that the lower limit of the driving voltage is not particularly limited, but it may preferably be 10 V or more. If the driving voltage is less than 10V, the current during heating the honeycomb structure 15 becomes large, so that the conductor wire should be thick.

DESCRIPTION OF REFERENCE NUMERALS

10 dehumidifying device
11 outer peripheral wall
12*a* first end face
12*b* second end face
13 cell
14 partition wall
15 honeycomb structure
16*a*, 16*b* pair of electrodes
17 dehumidifying layer
18 terminal
20 power source
30 inflow pipe
40 first outflow pipe
50 second outflow pipe
60 switching valve
65 differential pressure valve
66 base portion
67*a*, 67*b* opening and closing portion
68*a*, 68*b* spring portion
70 steam trap
80 ventilator
85*a* first ventilator
85*b* second ventilator
90 control unit
100 vehicle air conditioning system

The invention claimed is:

1. A vehicle air conditioning system, comprising:

a dehumidifying device comprising: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; a pair of electrodes provided on the first end face and the second end face; and a dehumidifying layer formed on a surface of each of the partition walls;

a power source for applying voltage to the pair of electrodes;

an inflow pipe for allowing air from a vehicle interior or a vehicle exterior to flow into the dehumidifying device;

a first outflow pipe for returning the air that has been dehumidified by the dehumidifying device to the vehicle interior;

a second outflow pipe through which the air containing moisture released by a regeneration process of the dehumidifying device is circulated; and a switching valve provided at a branch portion between the first outflow pipe and the second outflow pipe, the switching valve being capable of switching the flow of the air to the first outflow pipe or the second outflow pipe, wherein a steam trap is provided in the second outflow pipe, and wherein the second outflow pipe merges with the first outflow pipe on a downstream side of the steam trap.

2. The vehicle air conditioning system according to claim 1, wherein the switching valve is a differential pressure valve capable of switching the flow of the air to the first outflow pipe or the second outflow pipe, and wherein the vehicle air conditioning system further comprises:

a first ventilator for controlling the differential pressure valve to switch the flow of the air to the first outflow pipe; and a second ventilator for controlling the differential pressure valve to switch the flow of the air to the second outflow pipe.

3. The vehicle air conditioning system according to claim 1, wherein the first outflow pipe and the second outflow pipe have a double pipe structure in which the second outflow pipe is disposed within the first outflow pipe at the branch portion between the first outflow pipe and the second outflow pipe.

4. The vehicle air conditioning system according to claim 2, wherein the first ventilator is disposed in the inflow pipe.

5. The vehicle air conditioning system according to claim 2, wherein the second ventilator is disposed in the second outflow pipe.

6. The vehicle air conditioning system according to claim 1, wherein the material having the PTC property comprises barium titanate as a main component.

7. The vehicle air conditioning system according to claim 1, wherein the dehumidifying layer further comprises an adsorbent having a function of adsorbing at least one component selected from carbon dioxide and volatile components, and/or a catalyst.

8. The vehicle air conditioning system according to claim 1, further comprising a control unit, wherein the control unit can execute:

a dehumidification mode where the vehicle interior is dehumidified by controlling the switching valve to switch the flow of the air to the first outflow pipe; and a regeneration mode where the dehumidifying layer is subjected to a regeneration process by applying a voltage to the pair of electrodes of the dehumidifying device, and controlling the switching valve to switch the flow of the air to the second outflow pipe.

9. The vehicle air conditioning system according to claim 8, further comprising a detection portion capable of detecting fogging of glass in the vehicle interior, wherein a control portion executes the regeneration mode when the fogging of the glass is detected, and the control portion executes the dehumidification mode when the fogging of the glass is not detected.

10. The vehicle air conditioning system according to claim 9, wherein the detection portion detects the fogging of the glass based on the temperature and the humidity in the vehicle interior.

* * * * *